United States Patent [19]

Jansen et al.

[11] 4,276,611
[45] Jun. 30, 1981

[54] DEVICE FOR THE CONTROL OF DATA FLOWS

[75] Inventors: Pierre G. Jansen; Jozef L. W. Kessels, both of Eindhoven, Netherlands

[73] Assignee: U.S. Philips Corporation, New York, N.Y.

[21] Appl. No.: 30,248

[22] Filed: Apr. 16, 1979

Related U.S. Application Data

[63] Continuation of Ser. No. 815,256, Jul. 13, 1977, abandoned.

[30] Foreign Application Priority Data

Jul. 23, 1976 [NL] Netherlands .......................... 7608165

[51] Int. Cl.³ .............................................. G06F 3/00
[52] U.S. Cl. ........................................................ 364/900
[58] Field of Search ... 364/200 MS File, 900 MS File

[56] References Cited

U.S. PATENT DOCUMENTS

| | | | |
|---|---|---|---|
| 3,337,853 | 8/1967 | Harrand | 364/200 |
| 3,411,140 | 11/1968 | Halina et al. | 364/900 |
| 3,473,160 | 10/1969 | Wahlstrom | 364/900 |
| 3,503,048 | 3/1970 | Avsan et al. | 364/200 |
| 3,794,983 | 2/1974 | Sahin | 179/15 A X |
| 4,006,465 | 1/1977 | Cross | 364/200 |

Primary Examiner—Harvey E. Springborn
Attorney, Agent, or Firm—Thomas A. Briody; Robert T. Mayer; James J. Cannon, Jr.

[57] ABSTRACT

A commutation device for the selective control of data transport. At least two data inputs and data outputs, each of the latter having a buffer for storing a data word. A number of possibilities of data transport can be selectively controlled, four for a single connection and two different ones for pair-wise connection. Seven input control lines are provided, two lines for receiving a signal which indicates whether information is present on the associated input line, two lines for indicating the selected output buffer, two erase lines for making a data buffer freely accessible after output of data from the data buffer, and one priority line for granting priority to one of the two input lines if both lines select the same data buffer. There are four output control lines, two lines which indicate that the data present on the input lines have been taken up in the selected output buffer, and two lines which indicate whether an output buffer contains data. The commutation device can effect the data transport itself and can be grouped in specific arrangements to form a buffer in which the data partly determine their own path.

17 Claims, 14 Drawing Figures

DEVICE FOR THE CONTROL OF DATA FLOWS

This is a continuation of application Ser. No. 815,256, filed July 13, 1977, now abandoned.

BACKGROUND OF THE INVENTION

This invention relates to a device for the control of data flows, comprising a first data input line, a second data input line, a first data output line, a second data output line, a connection network which is connected between the data input lines and the data output lines, and a control unit for controlling the flow of data through the connection network in order to establish a connection between a data input line and a data output line. A device of this kind is known from the article by K. N. Levitt et al., "A study of the data communication problems in a self-repairable multiprocessor", Proceedings Spring Joint Computer Conference, 1968 (A.F.I.P.S.) pages 515-527, notably FIG. 4. The known device has the function of a cross switch, so that two data flows received are conducted directly in either the crossed or the non-crossed mode. The known device has a memory capacity which is only capable of remembering its own condition, and it includes no further logic means. Thus, the known device has a limited range of application.

The invention has for its object to provide a device of this kind which offers more possible applications. The invention also has for its object to provide a device of this kind which has a buffer function for each data output path. The invention furthermore has for its object to provide a fast device, so that no long delay of the signals occurs or is required. The invention has for a further object to provide an inexpensive device. The invention has for another object to enable different kinds of network connections to be established by modular use of said devices.

SUMMARY OF THE INVENTION

The objects of the invention are achieved by positioning between the connection network and each data output line a separate data output buffer, the control unit being connected, by signal lines to the connection network in order to either selectively block all connections therein or to establish a single connection between a predetermined data input line and a predetermined data output line, or to establish at least two connections between predetermined data input lines and data output lines; said signal line being furthermore connected to an input of a logic network for the selective generation, associated with a controlled connection direction from a data input line, of a copy acknowledge signal for the relevant data input line; said control unit furthermore including a control input line for each data input line for receiving destination signals for the control of said connection directions.

Since the connection directions are selectively controlled, at least five conditions in addition to the two conditions of the known device are possible (for a total of seven states), because conduction may be blocked and not possible in any direction, or possible in only one connection direction, (either all connections blocked, or one of the four possibilities for a single conductive connection, or one of the two possibilities for two pair-wise connections). Furthermore, it is possible for a message to contain its own destination signals, so that it determines its own path. Furthermore, an acknowledge signal is always generated, so that a reliably operating question/answer situation is created.

The control unit preferably also includes an input for a priority signal in order to control, in conjunction with said destination signals, said single or multiple connections and, when at least two corresponding destination signals for one and the same data output buffer occur, to block at least one predetermined connection requested by a prevailing destination signal, to the relevant data output buffer. Conflict situations are thus avoided, so that errors are prevented.

Preferably, at least three data input lines and at least three data output lines are present, said connection network being a crossbar adapted thereto. A module of this kind, offering additional facilities, may be an attractive solution.

Preferably, for each data output buffer a presence line is connected to an output of the control unit in order to signal, after data transfer to a data output buffer, the presence of data to be transferred by a a data output line, a separate erase control line being connected for each data output buffer to an input of the control unit in order to deactivate, after a data transfer from a data output buffer, said presence signal for the relevant data output buffer. The presence line is capable of initiating further transmission, and superfluous data can be erased by the erase control line.

Preferably, two devices of the described kind cooperate so that a predetermined data output line of said first device is connected to a predetermined data input line of the second device, the presence line associated with the predetermined data output line being connected to the logic network associated with the predetermined data input line in order to act as a request signal; an output of the control unit of said second device being connected to the erase control line associated with the predetermined data output line in order to transfer an acknowledge signal. This results in an attractive cooperation.

The invention in its broadest sense thus combines the following functions in a simple device:
(a) for each data output line a data buffer is provided.
(b) the data buffers are selectively accessible by one of the data input lines.
(c) access is effected with a sequence of destination signals and acknowledge signals.
(d) access is co-controlled by a priority signal.
(e) the destination signals contain a request identifier and a destination signal.
(f) the data can be readily erased after transfer.
(g) the presence of data can control their further transmission.

These functions are implemented in accordance with the invention in an inexpensive device which is also fast as a result of the absence of further complexity; this is in contrast to the art in which a computer is used at a junction. Except for transmission functions only, the invention can also be used for very fast, specific search operations and attractive buffer functions. Furthermore, the cost of a centralized control unit can be saved by the shifting of the control functions to a low level. Furthermore, the invention involves only few bottlenecks in the data flow. As a result of the introduction of a buffer function for each data output line and the signalling of the status of the data buffers in the direction of the data flow (presence or request signals) as well as in the direction opposing the data flow (acknowledge or erase control signals), the invention has a wide range of application and very diverse networks can be constructed.

BRIEF DESCRIPTION OF THE DRAWINGS

The invention will be described in detail hereinafter with reference to the accompanying diagrammatic drawings.

DESCRPITION OF THE PREFERRED EMBODIMENTS

Figure 1:
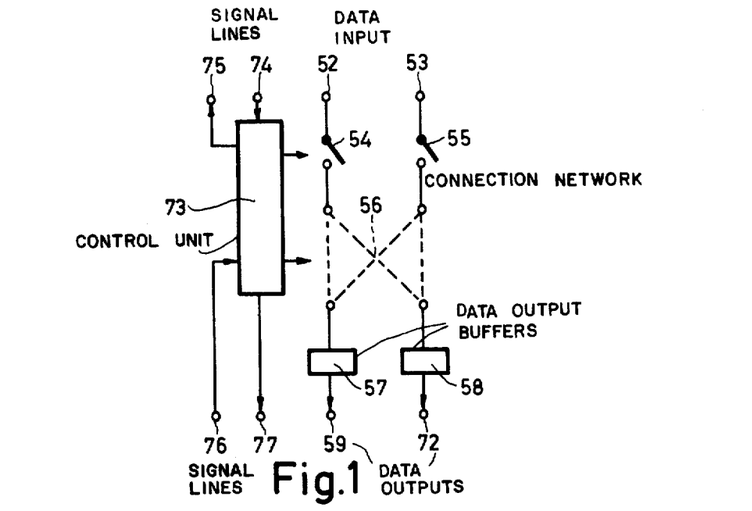
FIG. 1 is a simplified block diagram in outline form showing the basic functions of the preferred embodiment of the device for the control of data flows of the present invention.

FIG. 1 shows a simplified schematic block diagram of the preferred embodiment of a device for the control of data flows according to the present invention, comprising two data input lines 52, 53, a connection network 54, 55, 56, two data output buffers 57, 58, two data output lines 59, 72, a control unit 73 and signalling lines 74, 75, 76, 77. The control unit 73 stores the status of the buffers 57, 58. A request for access along the signal line 74 can close one of the switches 54, 55 (or both) in order to establish a connection between the input lines, via the crossing switch 56, and the buffers 57, 58, and the output lines 59, 72. An acknowledge signal is then supplied by signal line 75. The filling degree of the buffers is signalled on signal line 77 for output of their data by the lines 59, 72. The signal line 76 then receives an erase control signal in order to erase these data. The solution of priority conflicts and the detailed structure will be described hereinafter. The data lines 52, 53, 59, 72 can accommodate an arbitrary number of bits, as can the signal lines 74, 75, 76, 77, for the independent signalling of the data lines and buffers.

Figure 2:
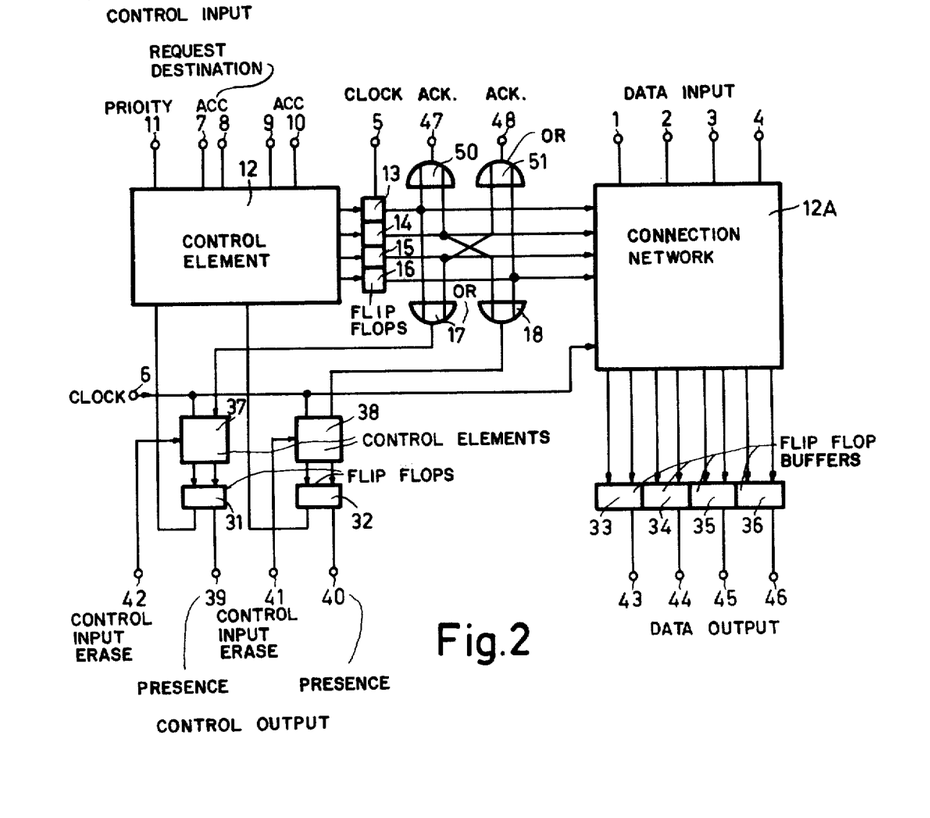
FIG. 2 is a schematic block diagram of the device of FIG. 1.

FIG. 2 is a schematic block diagram in further elaboration of the preferred embodiment of FIG. 1, comprising four data input terminals 1 through 4, four data output terminals 43 through 46, seven control input terminals 7 through 11, 41, 42, four control output terminals 39, 40, 47, 48, four logic OR-gates 17, 18, 50, 51, ten flipflops 13 through 16 31 through 36, three control elements 12, 37, 38, two clock pulse input terminals 5, 6 and a connection network 12A.

The device serves for the transmission of data messages or words of two bits each, said messages (words) appearing in parallel on data input paths as specified hereinafter. An extension for a plurality of bits can be realized by extension in parallel. The two data input paths for the embodiment of FIG. 2 comprise the terminals 1,3 and 2,4, respectively. The two data output paths comprise the terminals 43,45 and 44,46 respectively. The conductivity status of the connection network 12A between data input path and data output path is determined by the data stored in the four flipflops 13 through 16. In given cases there may be seven states, that is, either all connections blocked, or one of the four possibilities for a single conductive connection, or one of the two possibilities for two pair-wise connections), which could then be realized by three flipflops (see also FIG. 1.) The embodiment shown in FIG. 2, however, requires hardly any decoding. If the flipflop 13 contains a logic "1", the data terminals 2, 4 can be connected to the data terminals 44, 46 via the flipflops 34, 36. If the flipflop 14 contains a logic "1", the data terminals 2, 4 can be connected to the data terminal 43, 45 via the flipflops 33, 35. A conflict situation does not inherently occur if both flipflops 13, 14 contain a logic "1", because in that case the input data are duplicated on two data output paths without modification of the contents of these data. This possibility will not be elaborated, hereinafter, notably the control thereof will not be described. If the flipflop 15 contains a logic "1", the data terminals 1, 3 can be connected to the data terminals 44 and 46 by the flipflops 34 and 36. If both flipflops 14 and 15 contain a logic "1", no conflict situation occurs, because the data flow from the terminals 1,3, 2,4 to the terminals 44,46 43,45 is realized in the crossing mode. If both flipflops 13 and 16 contain a logic "1", no conflict situation occurs, because the data flow from the terminals 1,3 2,4 to the terminals 43,45, 44,46 is then realized without obstruction in parallel form without crossing. However, if both flipflops 13 and 15 contain a logic "1", a conflict situation can in principle occur, because in that case the data terminals 1 and 2 are both connected to the flipflop 34 and hence to the output terminal 44, so that there is interaction between the data flows. This could be utilized in given cases. This possibility, however, is ignored hereinafter and the pairs of flipflops 13,15 and 14,16 will not simultaneously contain a logic "1". The control of the flipflops 13 through 16 by the first control element 12 will be described in detail hereinafter in reference to FIG. 7. If one of the flipflops 13 or 14 contains a logic "1", the terminal 47 carries, via the OR-gate 50, a logic "1" which acts as an acknowledge signal for the data input path comprising the terminals 2 and 4. The data present on these terminals are then stored, by the connection network 12A, in the flipflops 33,35 and 34,36, respectively, of the data output buffers (57,58 of FIG. 1), under the control of a clock pulse on the input terminal 6. The formation of the positions of the flipflops 13 through 16 is realized under the control of the preceding clock pulse on the input terminal 5. If one of the flipflops 15 or 16 contains a logic "1", a logic "1" appears in a corresponding manner on the terminal 48, said "1" acting as an acknowledge signal for the data input path comprising the terminals 1 and 3. The data thereof are then stored as described.

When one of the flipflops 13, 15 contains a logic "1", the second control element 37 receives a logic "1" from the OR-gate 17. From the control line 42, second control element 37 can also receive an erase signal. The control element 37 supplies signals, under co-control of a clock pulse on the input 6 to the flipflop 31 in order to generate a presence signal on the control line 39. If no signal (logic "0") appears on the line 42 and the OR-gate 17 supplies a logic "1", the flipflop 31 is set to the "1" position by means of a signal on the "1" output of the control element 37 under the control of a clock pulse on the terminal 6. The "1" on the terminal 39 then indicates that the flipflops 34 and 36 contain data for further transport. If an erase signal appears, the flipflop 31 is set to the "0" position and then signals the first control element 12 that the flipflops 34 and 36 are empty and prepared to receive new data. The third control element 38 operates correspondingly for the data contents of the flipflops 33, 35. FIG. 2 shows the flipflops 31 through 36 as set/reset flipflops (SR flipflops). Other solutions in this respect can be used in a corresponding manner.

The clock pulse terminals 5, 6 are alternately activated by a clock not shown. When the terminal 5 is activated, the flipflops 13 through 16 are set. Subsequently, the control signal on the terminals 47, 48 acknowledge and the signals for the second and third control elements 37, 38 are generated by combinatory logic. Under the control of the clock pulse on the terminal 6, the connection network 12A is rendered conductive, the flipflops 33 through 36 are filled and the position of the flipflops 31, 32 is changed accordingly; the data are then available for further transport: when used in a network, the presence signals on the terminals 39, 40 indicate that further transport is desired.

The control terminals 7, 8 are associated with the first data input path (terminals 1, 3). If a logic "1" signal appears on the terminal 7, a request signal for data to be transferred is indicated (access request, copy request). A logic "0" indicates that no access request is present: in that case the signal on the terminal 8 has no significance as regards the transport. This signal combination can possibly be used in a different manner, for example, for indicating an error condition or for signalling that the information must be transported to both output paths as already described. If the terminal 7 carries a logic "1", a logic "0" on the terminal 8 indicates that this access request concerns the first data output path of the terminals 43, 45. A logic "1", however, indicates that this request concerns the second data output path of the terminals 44, 46. The terminals 9, 10 are associated with the second data input path (terminals 2, 4). An access request is made only if a logic "1" is present on the terminal 9. The signals on the terminal 10 then have the same effect and meaning as the previously described signals on the terminal 8.

The control line 11 controls the procedure in the case of a priority conflict. When a priority conflict is permissible, as already described (in that case the output buffer would form, for example, a bit-wise OR-function of two input words), the subsequent control is absent or switched off. A priority conflict arises only if the terminal 7 and the terminal 9 both receive a logic "1" and if moreover, the terminals 8 and 10 receive the same signal. A suitable control procedure is then as follows: if the terminal 11 receives a logic "0", the first data input path (terminals 7, 8 1, 3) has priority, and if the terminal 11 receives a logic "1", the second data input path (terminals 9, 10 2, 4) has priority. The access request of the data input path not having priority is then blocked for the time being.

Figure 3:
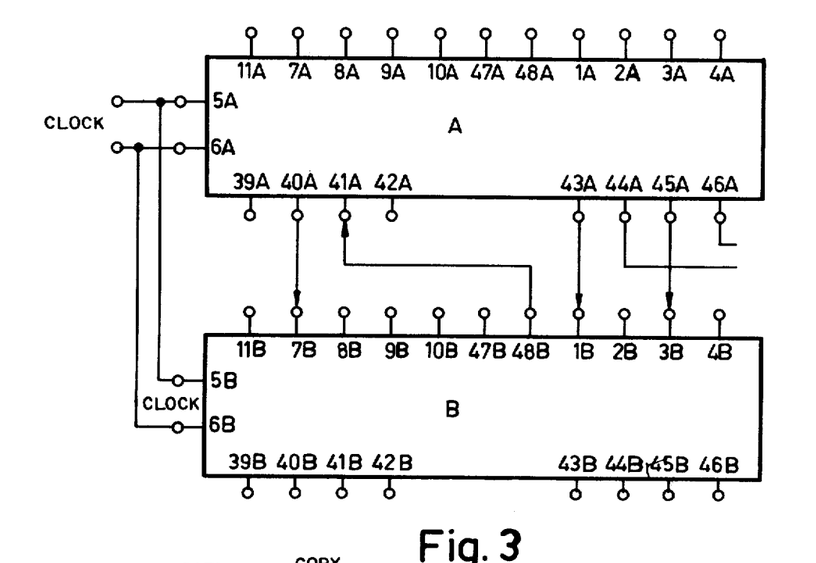
FIG. 3 is a schematic diagram showing two of the devices of FIG. 2 connected in series.

FIG. 3 shows a combination of two devices A, B having the embodiment shown in FIG. 2. The internal construction is not shown and the connections are numbered in accordance with FIG. 2. The first data output path of the device A (terminal 43A, 45A), is connected to the first data input path of the device B (terminals 1B, 3B). The output signal on the output terminal 40A signals the terminal 7B that the relevant output buffer has been filled with data to be transported. The presence signal from 40A (status) thus acts as a request. signal (copy request) from 40A relative to device B. The direction of the data transport is controlled by a signal on the terminal 8B which can be controlled by a constant signal, by separate external control, or by a data signal derived from the transported data. This may be, for example, the most significant bit of the data word. The signal on the terminal 48B acts as a copy acknowledge signal so that the data can be transported, for which purpose the relevant data output buffer must be empty and the relevant combination direction must be free. This signal is applied to the terminal 41A as an erase control signal, so that it is signalled that the data in the relevant output buffer are no longer required.

It has been assumed in the foregoing that a well-defined distinction exists between data signals and control signals. This need not be the case. If the terminal 8B in FIG. 3 is connected to one of the output lines of a data output path of the device A, a transport pattern arises which is controlled by the contents of the transported data words.

It has also been assumed that all data of a message can be transported simultaneously between the devices shown in FIG. 3. If a message is longer, it can be subdivided into sub-messages which are then successively transported by a transmitting device, for example, a central processor, to the device shown in FIG. 2 which is connected thereto. Such a steady flow is liable to be interrupted during transport (for example, because other data must pass through the same device). Moreover, additional control data for controlling the path to be followed (see above) must then often be dispatched so that the efficiency is reduced. In that case it is desirable to compose messages of a larger number of bits than can be simultaneously transported.

Figure 4:
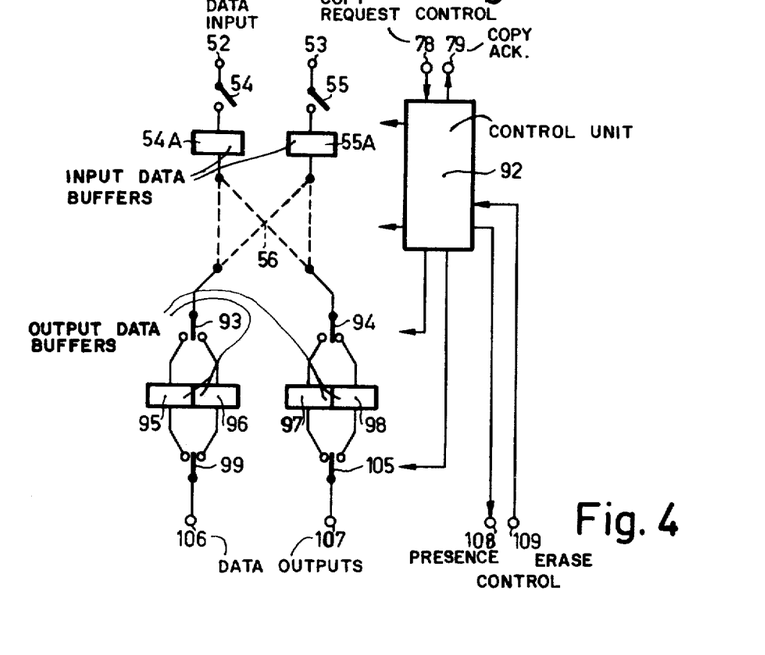
FIG. 4 is a simplified block diagram of an alternate embodiment of the device of FIG. 1 modified to increase the length of the data words.

To this end, FIG. 4 shows a modification of the preferred embodiment of FIG. 1 in which corresponding parts are denoted by the same reference numerals. Each input switch 54, 55 is directly followed by a data buffer 54A, 55A respectively, which has the same capacity as each of the half data output buffers 95 through 98. The switches 93,99 and 94,105 pair-wise have opposite positions, so that each of the half data output buffers 95 through 98 is connected either to the relevant output path 106, 107 or to the connection network 56; data can thus always be outputted as well as transmitted. The connections are thus more effectively used: without additional data paths, the transport speed is doubled. In accordance with FIG. 1 a buffer 57,58 could not act as a transmitter and a receiver simultaneously. After the reception or transmission of data to or from a buffer 95-98, the associated pair of switches is switched over by a command signal from the control unit 92. The organization of the copy request 78, copy acknowledge 79, presence status, 108 and erase control 109 signals is now also different, in a sense such that they only act on or are generated parallel to the first half of a data transport. The filling and erasing of the data buffer can be effected under the control of a four-fold clock pulse cycle, the even pulses of which realize these functions. The data buffers 54A, 55A are in this case required because during the first phase of the clock pulse cycle the copy acknowledge signal is generated, while the data output buffer 95 through 98 is filled only in a subsequent phase. During said first phase, the data to be stored are then present in the input buffer 54A,55A. The input buffers may be dispensed with in the case of a six-fold clock pulse, because the various functions can be better separated in the time.

In given cases it is also advantageous to further increase the capacity of the buffers, so that they are filled only by an m-fold transport, m then being equal for example, to 4. They then comprise m.n positions, n being the width of the data path line (the number of terminals 1, 3 and so forth) (FIG. 2). For each data buffer there is provided a filling degree indicator such as a counter whose position is increased by one under the control of the clock pulse terminal 6, in the case of a "1" signal from the relevant control unit 37,38, (FIG. 2), and is decreased by one in the case of a received erase control signal. If both signals are received, nothing happens and the position of the counter is maintained. The connection network comprising the elements 93, 94, 99, 105 of FIG. 4, can then be organized in accordance with the first-in-first-out (FIFO) principle. The counter then comprises m+1 positions, which is also possible in FIG. 4 if the successive data are all self contained and do not have a two-by-two relationship.

Figure 5:
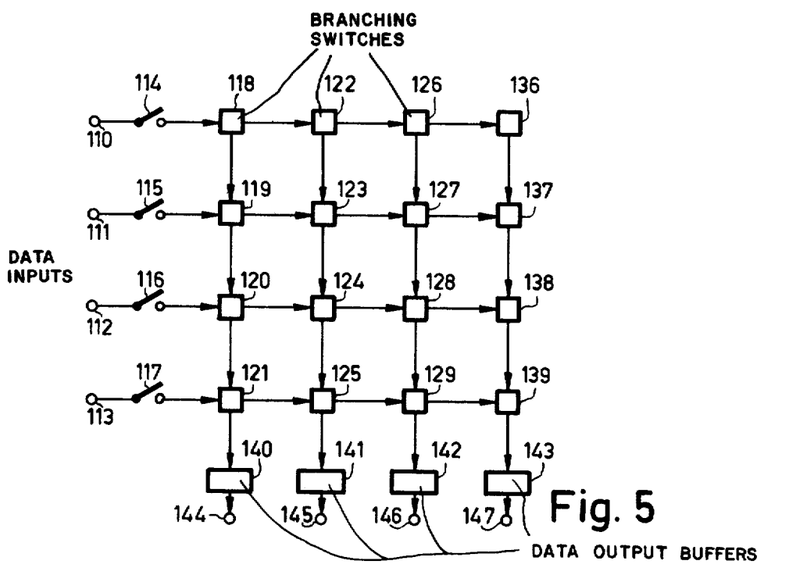
FIG. 5 is a schematic diagram of a second alternate embodiment of the device of FIG. 1 having an increased number of data input lines.

FIG. 5 shows a further modification of the preferred embodiment FIG. 1, comprising four data inputs 110 through 113 four switches 114 through 117, sixteen branching switches 118 through 129, 136 through 139, four data output buffers 140 through 143 and four data outputs 143 through 147. The various control lines and the control unit have been omitted for the sake of simplicity. The operation of the switches and buffers is in accordance with FIG. 1. The branching switches connect or do not connect an input line, extending from the left to the right in the figure, to an output line extending from the top to the bottom of the figure. If no splitting and/or combining of data may occur (see the description given with reference to FIG. 1), at the most one branching switch may be activated for each row and for each column. The destination signals of FIG. 5 thus each time contain two data bits.

Figure 6:
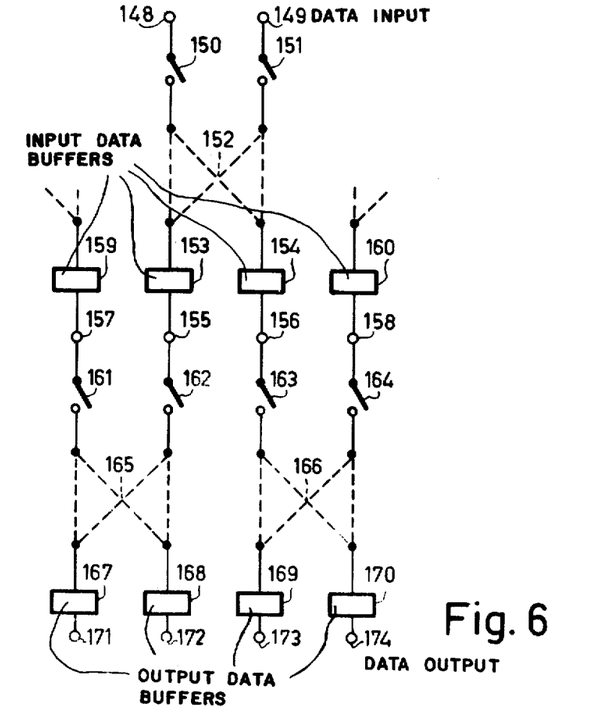
FIG. 6 is a simplified block diagram showing a combination of devices of FIG. 1.

FIG. 6 shows a combination of devices as shown in FIG. 1, comprising the switches 150, 151, 161, 162, 163, 164, cross-connections 152, 165, 166, and data buffers 153, 154, 159, 160, 167-170. The control units have been omitted for the sake of simplicity. Functionally, the same effect is obtained if the switches 162, 161 are connected before instead of after the data buffers 153, 159. A modular device in accordance with the preferred embodiment of the invention can then be constructed as an integrated circuit, comprising the elements 159, 153, 161 162, 165, so that the operation of the network is not modified; a construction of this kind of a module is thus also contemplated by the invention. The control may or may not be embodied in the same integrated circuit, as will be described hereinafter.

Figure 7:
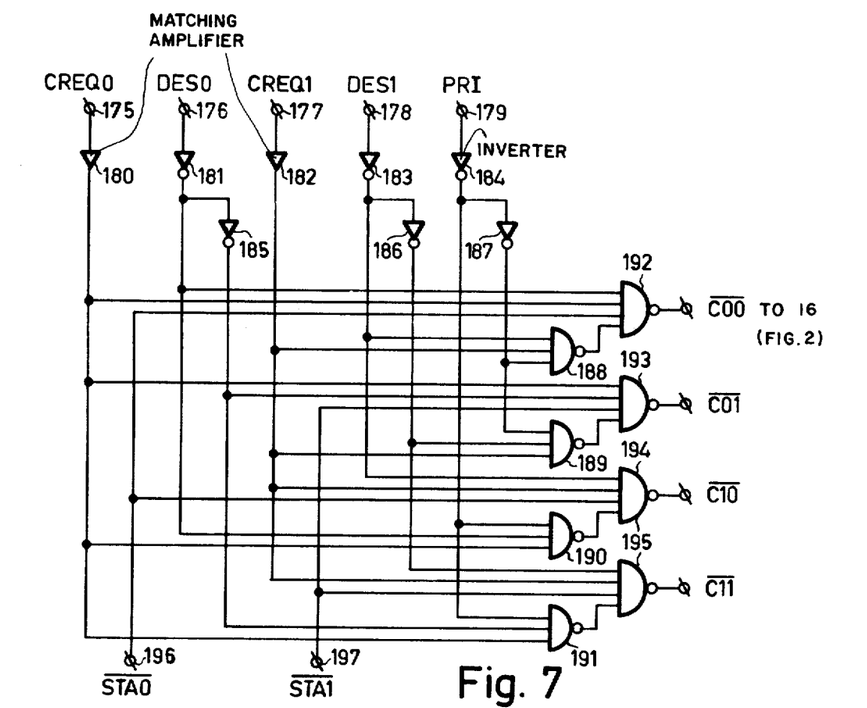
FIG. 7 shows the logic circuit of the first control element of FIG. 2.

FIG. 7 shows the logic circuit of the first control element 12 of the preferred embodiment of FIG. 2, for the generation of control signals for the transmission routes in network 12A, the first index of the Cij signal indicating the data source and the second indicating the destination. The circuit comprises two matching amplifiers 180, 182 which supply a standardized, non-inverted signal, six inverters 181, 183, 184, 185, 186, 187 which supply a standarized inverted signal, and eight logic NAND-gates 188 through 195 comprising three or four inputs. The following signals are present on the terminals 175 through 179:

175 CREQ0 request signal first data input line;
176 DES0 destination identifier first data input line;
177 CREQ1 request signal second data input line;
178 DES1 designation identifier second data input line;
179 PRI priority signal.

Terminals 175 to 179 of FIG. 7 thus correspond to terminals 7 through 11 respectively of FIG. 1.

For example, the gate 192 supplies a logic "0" if the first data input path requests a connection to the first data output path (CREQ0=1, DES 0=0), the relevant data output buffer is empty (STA 0=0, a bar denoting the inverted value), while the NAND-gate 188 supplies a logic "1". The latter takes place if: the second data input path does not request a connection (CREQ 1=0) or the first data input path (DES 1=1) is not concerned, or the first data input path has a higher priority (PRI=0). The signal C00=1 from NANO gate 192 corresponds to the logic "1" which is stored in the flipflop 16 in FIG. 2.

Figure 8:
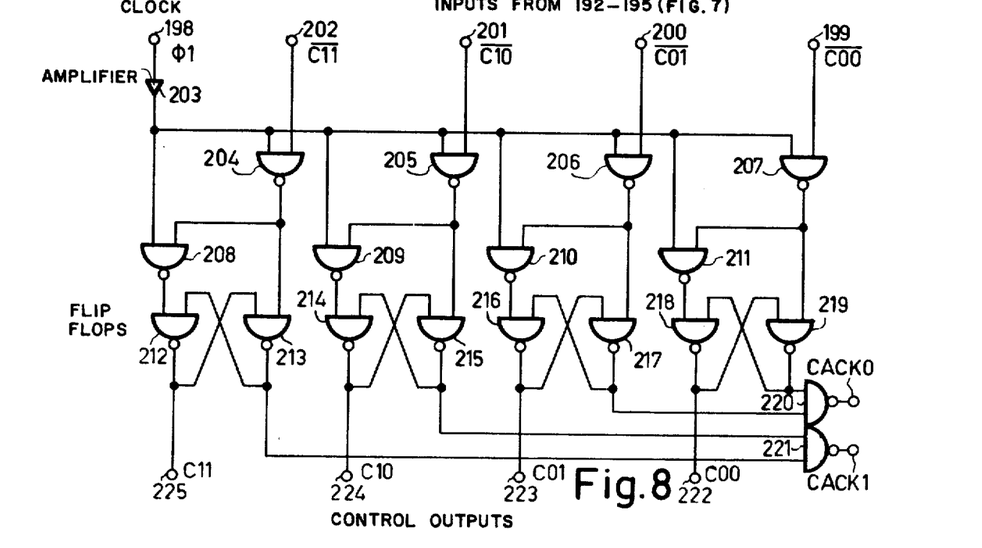
FIG. 8 shows the logic circuit or generating the "acknowledge" signal in the device of FIG. 2.

FIG. 8 shows the logic circuit for generating the acknowledge signals at terminals 47,48 of FIG. 2. The circuit comprises five input terminals 198 through 202, a matching amplifier 203, and eighteen logic NAND-gates 204–221. The terminals 199-202 are connected to the respective outputs of the gates 192-195 of FIG. 7. The terminal 198 receives the odd numbered clock pulses Φ 1 terminal 5, FIG. 2. If this clock pulse appears and terminal 199 receives a logic "0", gate 211 receives two logic "1" signals and supplies a "0" which appears, via gate 218, as a "1" on output 222: (C00). Flipflop 218/219 is then set so that gate 220 receives a "0" and supplies a "1". This signal acts as an acknowledge signal for the first data input path (CACK 0=1). If $\overline{C00}$=1, terminal 222 is at "0". Flipflop 218/219 does not supply a "0" to gate 220. FIG. 8 thus constitutes an embodiment in NAND-gates of the elements 13-16, 50, 51 of FIG. 2.

Figure 9:
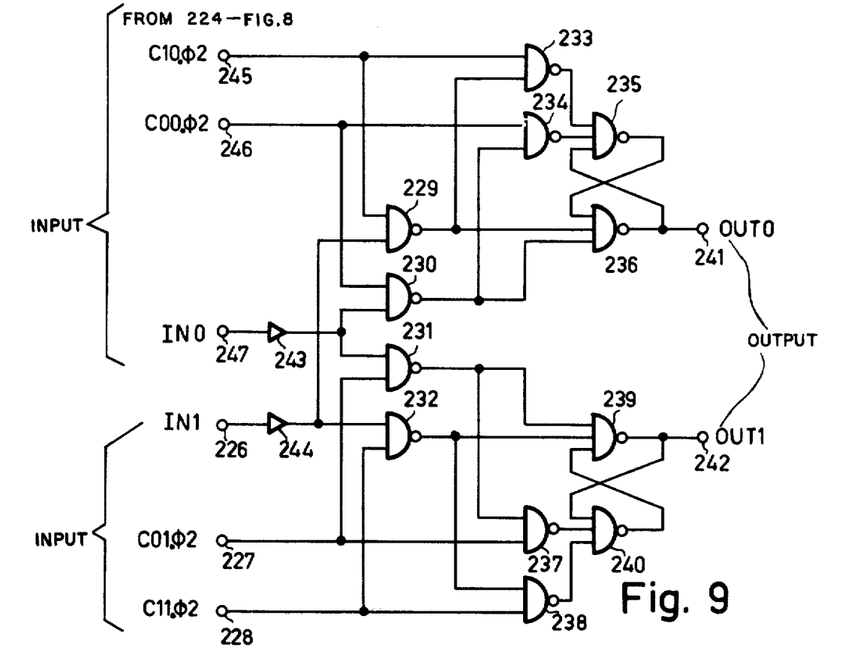
FIG. 9 shows the logic circuit for the connection network of FIG. 2.

FIG. 9 shows a the logic circuit for the connection network 12A and its output buffers 57,58 of FIG. 2, comprising six input terminals 226-228, 245-247 two matching amplifiers 243, 244, twelve logic NAND-gates 229–240, and two output terminals 241, 242. As an example, terminal 245 receives the logic AND function of C10 (FIG. 8, terminal 224) and the even clock pulses Φ2 terminal 6, FIG. 2. The terminals 246, 227, 228 receive corresponding signals. The terminal 247 forms part of the first data input path and receives, for example, the $p^{th}$ data bit of a number of parallel arriving data bits. Similarly, the terminal 226 forms part of the second data input path. If C00Φ2=IN0=1, the gate 230 receives two logic "1" signals, with the result that, after double inversion, the terminal 241 also becomes logic "1"; this information is stored in the flipflop 235,236. Thus, the first data input path is connected to the first data output path. The gates 229 through 232 thus form the data connection network 56 of FIG. 1; the flipflops 235,236 239,240 corresponding to flipflops 33, 34 (FIG.2), but in this circuit do not directly receive the clock pulse. This offers an advantage because, since the clock pulse is not directly received, a separation is formed between data signals and control signals. The circuit shown in FIG. 9, therefore, can be readily constructed to be modular, because only four control lines are required. This offers advantages for its construction as an integrated circuit.

Figure 10:
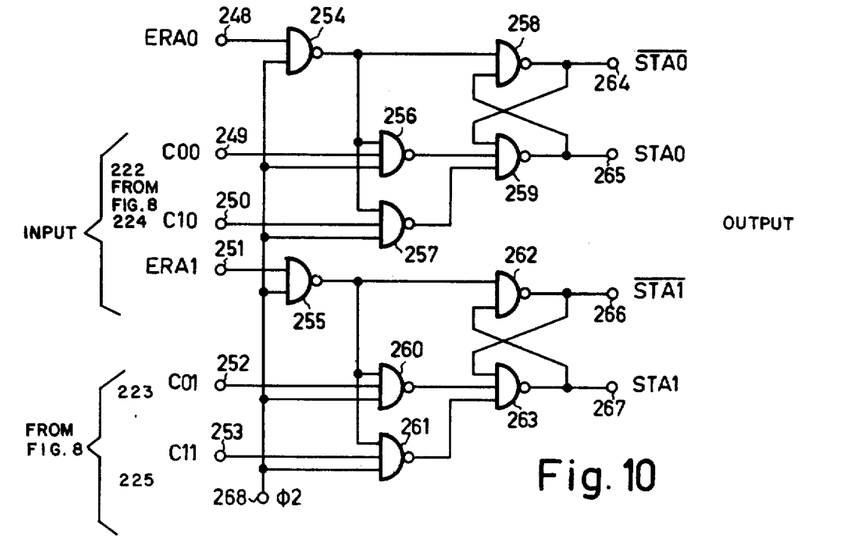
FIG. 10 shows the logic circuit for the control elements of FIG. 2 which generate the status signals of that device.

FIG. 10 shows the logic circuit for the control elements 37,38 and associated flipflops which generate control status signals for the device of FIG. 2. The circuit comprises seven signal input terminals 248 through 253 268, ten logic NAND-gates 254 through 263, and four output terminals 264 through 267. The terminals 249 through 250, 252, 253 receive the signals Cij from the output terminals through 222-225 of FIG. 8. The terminals 248, 251 receive the erase control signals in the manner described for the terminals 41 and 42 for the data output buffers 33 to 36 of the first and the second data output paths, respectively. If the signal C00 or C10="1", and the signal ERA0="0", the gate 259 receives a logic "0" through one of the gates 256, 257, with the result that the output signal on the terminal 265 becomes "1": the buffer has then be filled; the signal $\overline{STA0}$ is applied at terminal 196 as a filling degree signal to the circuit shown in FIG. 7. If, however, ERA0="1", the output signal on the terminal 264 becomes "0". Thus, the elements 37, 38, 31, 32 of FIG. 2 are implemented.

Figure 11:
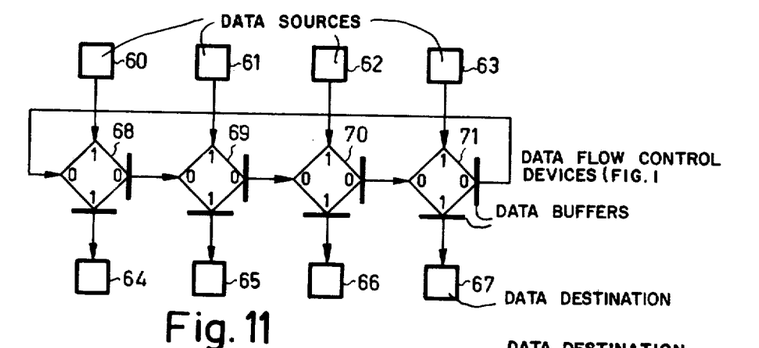
FIG. 11 is a simplified schematic block diagram showing a combination of four of the devices of FIG. 1.

FIG. 11 is a simplified schematic block diagram showing a combination of four devices as shown in FIGS. 1 and 2 comprising four data sources 60 through 63, four data destinations 64 through 67, and four of said devices 68 through 71. The data buffers in the output lines are denoted by transverse strokes bars. The first data input and the first data output of a module are each time denoted by a "0", the second data input and the second data output each time being denoted by a "1". The modules are included in a loop. The control of the data transport is in this case provided by the two most-significant data bits which are transmitted by the data source and which are included in the transport. The data bits of the first and the second input path are denoted as C1, C2 and D1, D2 respectively. The data destinations (for example, peripheral apparatus) 64 through 67 have, for example, (destination) codes 00, 01, 10, 11. The following logic functions are then supplied to the terminals 8 and 10 (FIG. 2, control element 12), respectively:

68: $\overline{C1}.\overline{C2}\ \overline{D1}.\overline{D2}$

69: $\overline{C1}.C2\ \overline{D1}.D2$

70: $C1.\overline{C2}\ D1.\overline{D2}$

71: $C1.C2\ D1.D2$

These logic functions are realized per module by two separate gates. In the case of, for example, eight modules, these gates are formed by two logic gates having three inputs each. Furthermore, all terminals 11 (FIG. 2, control element 12) are continuously connected to a logic "0" signal. As a result, the signals moving through the loop have priority in order to reduce the risk of congestion. In some cases it may be necessary to take additional steps to prevent total jamming. Such a step may consist in the serial inclusion in the loop of an additional module to which no data source is connected.

Figures 12, 13:
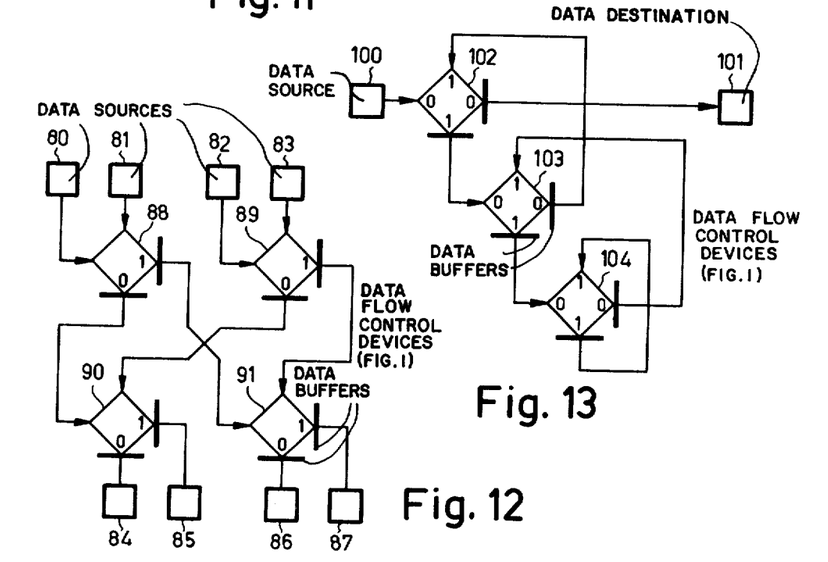
FIGS. 12, 13 and 14 show alternate combinations of four, three and four devices respectively similar to the combination shown in FIG. 3.

FIG. 12 shows a further combination of four devices of FIG. 1, comprising four data sources 80 through 83, four data destinations 84 through 87, and four of said modules 88 through 91, which are in this case arranged in a branched structure. The data output paths of the modules 88, 89 are each connected to data input paths of the modules 90, 91. The control of the data transport can again be realized by way of the two most-significant data bits which are again coded as C1, C2 (first data input path) and D1, D2 (second data input path), respectively. The address bits are used as follows: in the modules 88 and 89, C1 and D1 are applied to the terminals 8 and 10 respectively of control element 12, FIG. 2. In the modules 90 and 91, the data bits C2 and D2 are supplied to the terminals 8 and 10, respectively (FIG. 2). The arrangements shown in the FIGS. 11 and 12 offer different advantages. The advantages of FIG. 11 are:

a smaller number of modules are required (for larger numbers of sources or destinations. The advantages of FIG. 12 are: the messages need pass through a smaller number of modules (in the case of larger numbers of or destinations); messages do not so readily interfere with each other's transport; part of the network continues to operate should a module become defective; no additional gates are required for address control; during the transport, the address of the data source can be substituted for that of the data destination. This is because, after the modules 88, 89, the address bits C1, D1 have been processed, so that they are free. Thus, the width of the data paths may be smaller if the receiver must know the address of the source. It is to be noted that data sources can at the same time act as a destination when they are doubly connected to the network.

FIG. 13 shows a further combination of three devices as shown in FIG. 1, comprising one data source 100, a data destination 101, and three devices 102 through 104 as shown in FIG. 1. If the data buffer between the module 102 and the data destination 101 is empty, or has unused storage capacity, the data input line of the data source 100 is directly connected to this data buffer. If said data buffer does not have free storage capacity, said data input line is connected to the data buffer in the data output put line connected to the module 103 (provided there is room therein; otherwise a waiting situation occurs). This procedure is controlled in that the terminal 8 (DES0) (FIG. 2) in the module 102 receives the data from the terminal 40 (STA0) (FIG. 2), the destination thus being determined by the availability of the output buffer of the first data output path. The modules 103 and 104 are controlled in a similar manner, so that each message originating from the data source 100 is stored, if possible, in the first free data buffer of the modules 102-104 which is indicated by a "0". If all three buffers are full, first the data output buffer of the module 104 which is denoted by a "1" is filled, and in this sequence successively the buffers "1" of the modules 103 annd 102. If the data destination 101 takes up data at a given instant, the "0" data output buffer of the module 102 becomes empty. All terminals 11 (FIG. 2) of the modules 102, 103, 104 continuously receive a logic "1" signal, and the terminals 10 (FIG. 2) receive a logic "0" signal. Thus, if the "0" data buffer (the "first") of the module 102 is empty, it is filled with first priority with the data from the "0" output buffer of the module 103 and, with a lower priority, with the data directly originating from the data source 100. If the "0" output buffer of the module 103 is empty, it is filled with first priority with data from the "0" output buffer of the module 104. Only if the two output buffers of the module 104 and the "0" output buffer of the module 103 are empty, it is possible to fill the latter with the data from the "1" output buffer of the module 102. Thus, the messages stored are despatched so that the oldest message is despatched first (FIFO system). Thus, six successive positions are present, the order of the data buffers being as follows: 102-0, 103-0; 104-0; 104-1; 103-1; 102-1. As a result of the repeated end-around coupling, no information can be lost. The capacity of the network can be readily increased by extending the series of modules between the first module 102 and the last module 104 and by connecting all modules of this series in the same manner as the module 103 to their relevant predecessors and successors; each time the first data input and output paths are then connected to the preceding module of the series and the second data input and output paths are connected to the next module of the series.

Figure 14:
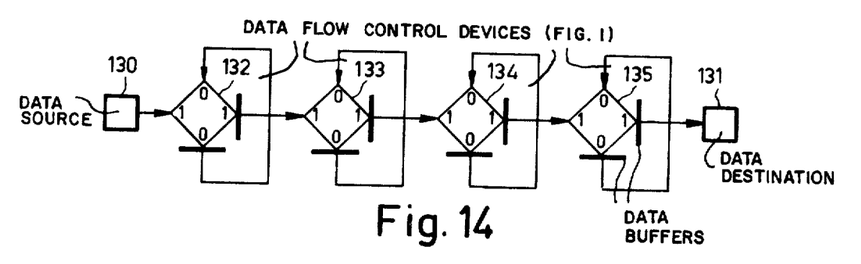

FIG. 14 shows a further combination of four devices as shown in FIG. 1, comprising a data source 130, a data destination 131, and four devices 132 through 135 as shown in FIG. 1. The network serves to sort data messages originating from the data source 130. In this example, the data source 130 each time despatches four (or five) messages, the interval in the time therebetween not being important. In this case the same connections are established in each module, i.e. the first data output path is coupled end-around to the first data input path. The terminal 40 (STA0) (FIG. 2) is connected to the terminal 10 (DES1) (FIG. 2), so that the "0" data buffer is always filled first. Furthermore, the terminal 8 (DES0) (FIG. 2) is connected to the terminal 9 (CERQ1) (FIG. 2). Therefore, if no message arrives via the second data line of a module, the information then stored remains in the first output buffer of the relevant module. If this message does arrive, both messages have the same destinatiion signal, i.e. for the second data output buffer of the relevant module, so that a conflict occurs. The terminal 11 (signal PRI) (FIG. 2) is connected to an output of a comparson circuit (not shown) in order to solve this conflict. This comparison circuit can compare, for example, the value of the two messages arriving. If the data arriving via the second data input line have a value lower than the data stored in the "0" data output buffer of the relevant module, the terminal 11 (FIG. 2) receives a logic "0", which means that the data stored in this module are transferred to the next module, the newly applied data being stored in this module. In the opposite case, the newly arriving data are forwarded to the next module. Finally, the row of data messages will be stored so that the largest messages are in front in the direction of the data destination. Erasing is effected by applying a series of messages having the value "0". Other comparison criteria can also be executed.

The described circuits can be advantageously executed as an integrated circuit according to different technologies with the appropriate logic elements. A module, for example, as shown in FIG. 2, can be accommodated on a single substrate which, however, may alternatively accommodate several of such modules. Finally, in the case of a very wide data path, a module may also be divided between two or more separate substrate parts (chips).

What is claimed is:

1. A device for the control of data flows having at least a first and a second data input path and at least a first and a second data output path comprising:

a connection network having input connections to said data input paths and output connections to said data output paths;

each of said paths having at least two data lines in parallel;

a control unit having a control output connected to said connection network capable of establishing therein under control of respective signals a blocking of all connections in said connection network between any of said data input lines and any of said data output lines under a first set of prescribed conditions, a connection between a predetermined one of said data input lines and a predetermined one of said data output lines under a second set of prescribed conditions, and at least two difference connections between predetermined data input lines and predetermined data output lines under a third set of prescribed conditions;

a logic network connected to said control output for the selective generation, in association with a controlled connection direction from a data input line, of a copy acknowledge signal for the relevant data input line;

said control unit further including means for receiving destination signals for each data input for the control of connection directions in said connection network; and said distination signals comprising a request signal for data to be transferred (copy request) and a destination identifier for one of said output lines a separate data output buffer for each data output path connected between said connection network and said data output path.

2. The device as claimed in claim 1 wherein said control unit further comprises:

an input for a priority signal in order to control, in conjunction with said destination signals, said network connections such that when at least two corresponding destination signals for one and the same data output buffer occur, at least one predetermined connection requested by a prevailing destination signal to the said data output buffer is blocked.

3. A device as claimed in claim 1, wherein at least three data input paths and at least three data output paths are provided, said connection network being a matrix adapted thereto.

4. A device as claimed in claim 1 wherein, for each data output buffer, a presence line is connected to an output of said control unit in order to signal, after data transfer to a data buffer, the presence of data to be transferred by a data output line.

5. A device as claimed in claim 4, wherein for each data output buffer a separate erase control line is connected to an input of said control unit in order to deactivate, after a data transfer from a data buffer, said presence signal for the relevant data buffer.

6. A device as claimed in claim 4 further comprising a filling degree circuit for each data output buffer comprising:

at least two binary states, the state thereof being increased in the case of data received and being decreased in the case of data dispatched.

7. An assembly for controlling data flows comprising at least two devices as claimed in claim 6, wherein:

a predetermined data output line of the first device is connected to a predetermined data input line of the second device;

the presence line associated with the predetermined data output line of said first device being connected to a predetermined data input line of said second device to act as a request signal;

an output of the control unit of said second device being connected to the erase control line associated with the predetermined output line of said first device to transfer said acknowledge signal to said first device.

8. A series assembly of devices for the control of data flows having a plurality of devices as claimed in claim 4, further including:

a delay buffer processing data output in order of seniority wherein:

the second data output of the next to last device of the series is connected to the first data input of the last device of the series, the first data output of the last device of the series is connected to the second data input of the next to last device of the series, the second data output of each prior device of the series, however, being connected to its second data input, the first data input and the first data output of the first device of the series constituting the input and the output, respectively, of the complete series;

the destination signals of the second data input assigning the first data output;

the destination signals of the first data input being formed by the presence signal of the data output buffer of the first data output;

a priority signal ensuring that the second data input always has priority over the first data input.

9. A device for the control of data flows having a first and a second data input line; a first and a second data output line; a connection network connected between said data input lines and said data output lies, comprising:

control means for controlling selectively one out of the following seven allowable states:

i. no connection valid ii. a connection from said first data input line to said first data output line iii. a connection from said first data input line to said second data output line iv. a connection from said second data input line to said first data output line v. a connection from said second data input line to said second data output line vi. a connection from said first data input line to said first data output line and a connection from said second data input line to said second data output line vii. a connection from said first data input line to said second data output line and a connection from said second data input line to said first data output line;

said control means furthermore including:

a first copy acknowledged output line for signaling said first, third, sixth and seventh states;

a second copy acknowledge output line for signaling said fourth, fifth, sixth and seventh states;

a first destination signal input line for selectively requesting by a first value thereof said second and sixth states and by a second value thereof said third and seventh states;

a second destination signal input line for selectively requesting by a first value thereof said fourth and seventh states and by a second value thereof said third and sixth states;

said destination signals comprising a request signal for data to transferred and a destination identifier for one of said output lines;

a priority signal input for receiving a bivalent priority signal, thereupon granting a predetermined priority upon simultaneous receipt of two identical destination input signals; and separate data buffers of a one bit depth between said connection network and each respective data output line.

10. A device for the control of data flows as defined in claim 9 wherein said control means further comprises:

means for each of said data input lines for receiving destination signals for the control of said connection directions whereby a separate data input buffer is connected between each of said respective data input lines and the respective inputs of said connection network.

11. A device for the control of data flows as defined in claim 9 further comprising:

at least three data input lines and at least three data output lines;

said connection network being a cross bar adapted thereto.

12. A device for the control of data flows as defined in claim 9 wherein for each data buffer a presence line is connected to an output of said control unit in order to signal after data transfer to a data buffer the presence of data to transferred by a data output line.

13. A device for the control of data flows as defined in claim 9 wherein for each data buffer a separate erase control line is connected to a input line of said control unit in order to deactivate after a data transfer from a data buffer said presence signal for the relevant data buffer.

14. A device for the routing of data flows having a control unit and a connection network, said connection network having first and second data input lines for each receiving a data word consisting of n bits in parallel, first and second data output lines for each transmitting a data word consisting of n bits in parallel to a respective data output buffer connected thereto, each data output buffer furthermore having an output for outputting data contained therein, said connection network furthermore having a first control input for unblocking a connection between said first data input line and said first data output line, a second control input for unblocking a connection between said first data input line and said second data output line, a third control input for unblocking a connection between said second data input line and said first data output line, a fourth control input for unblocking a connection between said second data input line and said second data output line, and fifth control input for enabling said respective output buffers; said control unit having a sixth control input for receiving a first copy request signal with a first destination signal associated with said first data input line, a seventh control input for receiving a second copy request signal with a second destination signal associated with said second data input line, first combinatorial gating means having inputs connected to said sixth and seventh control input lines and outputs connected to said first, second, third and fourth control input lines for control of said copy request signals with destination signals producing unblocking signals on at most one of said first and third control input lines at a time and at most one of said second and fourth control input lines at at time; said control unit furthermore having second combinatorial gating means having inputs connected to said first and second control input lines for signalling a first "copy acknowledge" signal associated with said first data input line, third combinatorial gating means having inputs connected to said third and fourth control input lines for signalling a second "copy acknowledge" signal associated with said second data input line, fourth combinatorial gating means having inputs connected to said first and third control input lines for setting a first "data present" indicator associated to said first data output line, fifth combinatorial gating means having inputs connected to said second and fourth control input lines for setting a second "data present" indicator associated to said second data output line, whereby a first output of said first "data present" indicator is retrocoupled to an eighth control input line of said control unit for inhibiting the generation of unblocking signals on said first and third control input lines, whereby a first output of said second "data present" indicator is retrocoupled to a ninth control input line of said control unit for inhibiting the generation of unblocking signals on said second and fourth control input line; wherein said first and second "data present" indicators have first means for receiving a reset signal associated with said first and second data output lines, respectively, and further means for signalling a "data present" situation associated with said first and second data output lines, respectively, and wherein said control unit has a tenth control input line for activating unblocking signals on said first, second, third or fourth control input lines in time-shifted relationship with the setting of said first and second "data present" indicators.

15. A device as claimed in claim 14, wherein said control unit has an eleventh control input line for receiving a priority control signal of a first or second value for, upon coincidental appearance of said first and second destination signals both indicating the same data output line, at a first value blocking said first and second control input lines but at a second value blocking said third and fourth control input lines.

16. A device for the routing of data flows including a first and a second device as claimed in claim 14, wherein the first data output line of said first device is via the corresponding data output buffer connected to the first data input line of said second device, wherein said first "data present" indicator of said first device has a signalling output connected to the first copy request signal input of said second device, and whereby an output of said second combinatorial gating means of said second device is connected to a reset input of the "data present" indicator of said first device.

17. A device for the control of data flows, including a series (o ... n ... j) of devices as claimed in claim 15, wherein $o<n<j$ and wherein each $(n-1)^{th}$ device of the series has its second data output line connected to the first data input line of the $n^{th}$ device of the series, wherein each $n^{th}$ device of the series has its first data output line connected to the second data input line of the $(n-1)^{th}$ device of the series, wherein the $j^{th}$ device of the series has its second data output line retrocoupled to its second data input line, wherein the $o^{th}$ device has its first data input line unconnected to further devices of the series and its first data output line unconnected to further devices of the series for respectively constituting the data input lines, and output lines of the complete series, and wherein each device of its series has its second destination signal indicating its first data output line, its first destination signal being formed by the output of its "data present" indicator associated to its first data output line.

* * * * *

UNITED STATES PATENT AND TRADEMARK OFFICE
CERTIFICATE OF CORRECTION

PATENT NO. : 4,276,611

DATED : June 30, 1981

INVENTOR(S) : PIERRE G. JANSEN ET AL

It is certified that error appears in the above—identified patent and that said Letters Patent is hereby corrected as shown below:

Col. 12, Line 15, Claim 1, after "two" change "difference" to --different--.

Col. 14, Line 30, Claim 12, before "transferred" insert --be--.

Signed and Sealed this

Thirteenth Day of April 1982

|SEAL|

Attest:

GERALD J. MOSSINGHOFF

Attesting Officer     Commissioner of Patents and Trademarks